United States Patent
Gjerde

(10) Patent No.: US 10,301,000 B2
(45) Date of Patent: May 28, 2019

(54) VALVE FOR VENTILATION OF A TANK

(71) Applicant: Ventiq AS, Gjerdsvika (NO)

(72) Inventor: Mathias Hogne Gjerde, Gjerdsvika (NO)

(73) Assignee: Ventiq AS, Gjerdsvika (NO)

( * ) Notice: Subject to any disclaimer, the term of this patent is extended or adjusted under 35 U.S.C. 154(b) by 39 days.

(21) Appl. No.: 15/506,043

(22) PCT Filed: Aug. 26, 2015

(86) PCT No.: PCT/NO2015/050144
§ 371 (c)(1),
(2) Date: Feb. 23, 2017

(87) PCT Pub. No.: WO2016/032339
PCT Pub. Date: Mar. 3, 2016

(65) Prior Publication Data
US 2017/0240262 A1    Aug. 24, 2017

(30) Foreign Application Priority Data

Aug. 26, 2014  (NO) .................................... 20141040

(51) Int. Cl.
*F16K 24/04* (2006.01)
*B63J 2/08* (2006.01)
(Continued)

(52) U.S. Cl.
CPC ............... *B63J 2/08* (2013.01); *F16K 3/0254* (2013.01); *F16K 24/04* (2013.01); *F16K 24/044* (2013.01); *F16K 27/07* (2013.01); *F16K 27/12* (2013.01)

(58) Field of Classification Search
CPC ...... F16K 24/04; F16K 24/042; F16K 24/044; F16K 24/06; B63J 2/08; B63J 2/10
See application file for complete search history.

(56) References Cited

U.S. PATENT DOCUMENTS 2,393,078 A * 1/1946 Wager ..................... B63J 2/10
                                                         137/388
3,869,967 A * 3/1975 Lenz ........................ B63J 2/10
                                                         454/78
(Continued)

FOREIGN PATENT DOCUMENTS

EP    1130298 A1    9/2001
EP    2628676 A1    8/2013
(Continued)

OTHER PUBLICATIONS

Machine Translation for FR2232723A1.*
Berggren, Kristina, "International Search Report," prepared for PCT/NO2015/050144, dated Dec. 17, 2015, four pages.

*Primary Examiner* — Ian G Paquette
(74) *Attorney, Agent, or Firm* — Winstead PC

(57) ABSTRACT

A ventilation valve (100) for ventilation of a tank (not shown) containing a liquid where the liquid surface fluctuates over time at the same time as the ventilation valve (100) obstructs external liquid to enter into the tank through the ventilation valve, is described. The ventilation valve (100) comprises a structural main housing (1, 2) containing a valve unit (3, 4, 5) and respective ventilation channels (6, 7, 9, 10, 13, 14, 16) providing open communication between the tank and the atmosphere, and the valve unit includes a movable float body (4) obstructing liquid ingress into the tank through said ventilation valve (100). The valve unit is in the form of a replaceable valve module which includes the float body (4) which is received in a valve housing (3). The structural main housing (1, 2) includes a socket part (2) and one from the socket part (2) releasable cover part (1) in order to provide access to the replaceable valve module (3, 4, 5).

12 Claims, 3 Drawing Sheets

Figure 1:
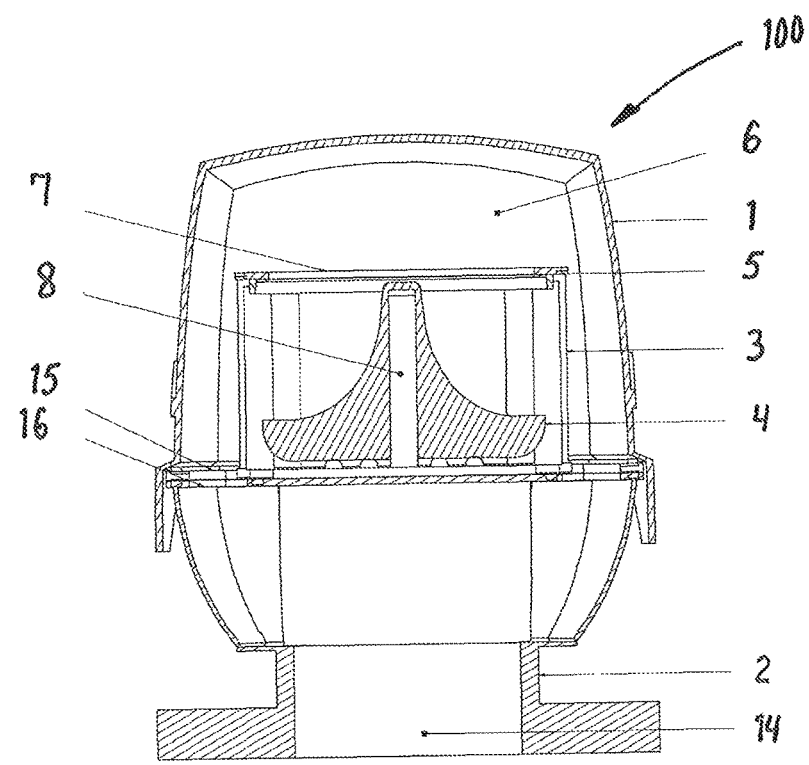

(51) Int. Cl.
  *F16K 27/12* (2006.01)
  *F16K 27/07* (2006.01)
  *F16K 3/02* (2006.01)

(56) References Cited

U.S. PATENT DOCUMENTS

| | | | | |
|---|---|---|---|---|
| 4,104,004 | A * | 8/1978 | Graef | F04B 53/06 |
| | | | | 137/202 |
| 5,823,259 | A * | 10/1998 | Royle | E03B 3/16 |
| | | | | 166/97.1 |
| 9,441,751 | B2 * | 9/2016 | van der Velde | F16K 24/046 |
| 2012/0037834 | A1 * | 2/2012 | Lang, III | E03F 5/08 |
| | | | | 251/368 |
| 2012/0174994 | A1 | 7/2012 | Sorensen | |
| 2015/0013779 | A1 * | 1/2015 | Sandvik | B63J 2/02 |
| | | | | 137/171 |

FOREIGN PATENT DOCUMENTS

| | | | | |
|---|---|---|---|---|
| FR | 2232723 A1 * | 1/1975 | | F16K 17/19 |
| GB | 191308618 A * | 11/1913 | | B63J 2/10 |
| GB | 1298232 A * | 11/1972 | | B63J 2/10 |
| NO | 920468 A | 8/1993 | | |
| NO | 177135 B | 4/1995 | | |
| WO | WO-9316310 A1 | 8/1993 | | |
| WO | WO-2013120987 A1 | 8/2013 | | |

\* cited by examiner

VALVE FOR VENTILATION OF A TANK

The present invention relates to a ventilation valve for ventilation of a tank (not shown) containing a liquid where the liquid surface fluctuates over time at the same time as the ventilation valve obstructs external liquid to enter into the tank through the ventilation valve, which ventilation valve comprises a structural main housing containing a valve unit and respective ventilation channels providing open communication between the tank and the atmosphere, and where the valve unit includes a movable float body obstructing liquid ingress into the tank through this ventilation valve.

Ventilation valves of this nature, is related to a valve for safe ventilation of service tanks onboard ships. A ship in operation has a requirement for a number of service tanks for use in operating the ship. It could be lubricating oil, ballast, diesel, drinking water and so on. Ventilation of such tanks is necessary for several reasons. Firstly, there is a need to provide for that air migrates freely when filling up or draining off the content of the tank. A lack of pressure equalizing in these tanks may result in structural damages on the tanks and the ship hull. Moreover, it is important that a certain stirring of the air above the liquid level is provided for to avoid unfortunate concentrations of gases in the tanks.

It has to be emphasized that these valves are not used for ventilation of inflammable and/or toxic cargo, since this belong to a different and much higher safety class.

The ventilation of service tanks is ensured in that a ventilation pipe is extending from the tank and up and out at deck level and terminates in a safety valve. This valve provides for open ventilation until the ship moves in such a way that the deck level gets in contact with the sea level.

In practice, this means that when the ship is forced deeper into the sea, a situation can occur that the sea enter onto the deck and threatens to flood the ventilation pipes projecting from the tank in the ship. In this case, the safety valve provides for baring out the sea from the tank when the different levels are crossing each other.

Examples on ventilation valves of this type are shown in EP 1130298 and WO 2013/120987.

Among the challenges with such valves, is the fact that the maintenance often is neglected since this, in practice, results in many work hours for checking all the valves onboard a ship. In addition, one can only test if the float itself is floating and not its ability to keep closed against the gasket, since the gasket is fixed to the valve. The alternative is that the entire valve is being disassembled and brought to a water basin where the entire functionality is tested. The need for testing both the float and the gasket finds its background in that the floats over time will lose their buoyancy and that the gaskets lose their ability to seal against the float, when the float is lifted up by its floating. The result may be that the tanks, which the valve shall keep free for contaminating sea water, gradually are filled up with sea water and in a fatal way influences on the stability of the ship. Also a risk exists that the fuel tanks are contaminated and, with the wide fetched consequences this entails, makes the ship engine to stop.

In order to provide a ventilation valve being able to take care of the mentioned challenges, i.e. is easy to inspect and maintain, a new solution is provided.

This solution is a ventilation valve of the introductory said kind, which is distinguished in that the valve unit is in the form of a replaceable valve module which includes the float body, which is received in a valve housing, that the structural main housing includes a socket part and one from the socket part releasable cover part in order to provide access to the replaceable valve module, that the respective ventilation channels to the atmosphere are established between the valve module and the cover part when the cover part is arranged on the socket part in its operating state, and that the ventilation channel towards the atmosphere extends through the bottom of the valve module, where external water that might enter through the same ventilation channel elevates the float body to sealing against the valve housing and prevents inflow to the tank.

With other words, one may say that the valve is mainly divided in three sections: two outer structures and one internal part, which part can be characterized as the «brain» of the valve and is securely clamped between the two main structures. In contrast to other corresponding valves having fixed channels, the internal part can now be pulled out for closer inspection. If desired, one may then replace the "valve brain" in its entirety and in this way obtain a totally upgraded valve by only replacing one single component.

In that the internal part and the corresponding lower structure has its opening from the underside, the air flow and possible out flowing liquid from the tank will have its orientation towards the ship hull. This in contrast to existing design which has to add guiding screens in order to direct the outgoing flow down towards the ship deck. In some countries the legislation is very strict regarding emission of most liquids coming from the ship.

In one embodiment, the cover part can be releasable via hinging means pivotally arranged to the socket part. Alternatively, the cover can easily be lifted off.

Conveniently, the cover part can via a locking device be lockable arranged to the socket part.

The valve body can be in the form of a float valve and may perform controlled motion within the valve housing, for example via an axle shaft or different form for guiding or control.

The cover part and the socket part may preferably include surfaces designed to be lying complimentary adjacent to each other when the parts are locked to each other, said surfaces receiving a gasket being sandwiched between said surfaces. It is also possible to use gasket sealant, all according to the circumstances.

The valve module may as an example be manufactured of a suitable plastic material, such as polyurethane, polyethylene and impact resistant polystyrene.

The cover part and the socket part can in turn be manufactured of a suitable metallic material, such as acid proof steel, Inconel, aluminum or cast iron.

The ventilation channels towards the atmosphere may extend substantially 90 degrees vertically relative to a ship deck.

As an example, the locking means can be manually operated by easy finger grip.

In one embodiment, the valve housing can have an annular opening in its top surface and the float valve can have an onion configuration with a circumferential surface designed for internal sealing against the annular opening in the top surface.

As an example, with a view to the handling of ballast water where coast near ballast water is replaced with ocean based ballast water, it is normal procedure to pump in the new ballast water from the underside of the tank and urge the old ballast water out from the top of the tank. In such a situation, the unwanted ballast water needs to be pumped out via the ventilation pipes and out on the deck. In order to be able to handle such a huge pump capacity, the ventilation pipe valves are normally completely disconnected from their ventilation pipe, such that the pressure drop becomes as small as possible. This is due to the fact that the pressure drop in traditional valves is too high for the ballast water pumps to be driven with sufficiently high capacity. The solution then will be to remove the entire valve, or in some instances, to arrange for a separate drainage under the valve in the form of a hatch or similar. For the valve herein described, such a procedure is not required. By separating the two main structures, i.e. by lifting the upper part, which is hinged to the lower part, and then remove the «valve brain», which is clamped between those two structures, the restriction creating said pressure drop, is removed. By the fact that the valve now stands open, the ballast water to be driven out from the tank, can flow freely out on deck without any pressure restrictions within the valve.

Another aspect with the invention, is that the valve by virtue of its design, allows for quick check of the state or condition of the valve. As mentioned, the design of today's valves suffers in that the maintenance is very time consuming and the labor is then often neglected. With the new design, minimal efforts will be needed to open up and separate the two structures, and with great ease be able to inspect and possibly replace components to perform maintenance.

The configuration of the valve also makes possible that the inner and active part of the valve can be replaced to a material which is more adapted to the environment in which the valve is operating. It be plastic or various metals. By altering the inner configuration, also the characteristics of the valve, conf. pressure drop, can be changed to a more appropriate configuration.

Figure 2:
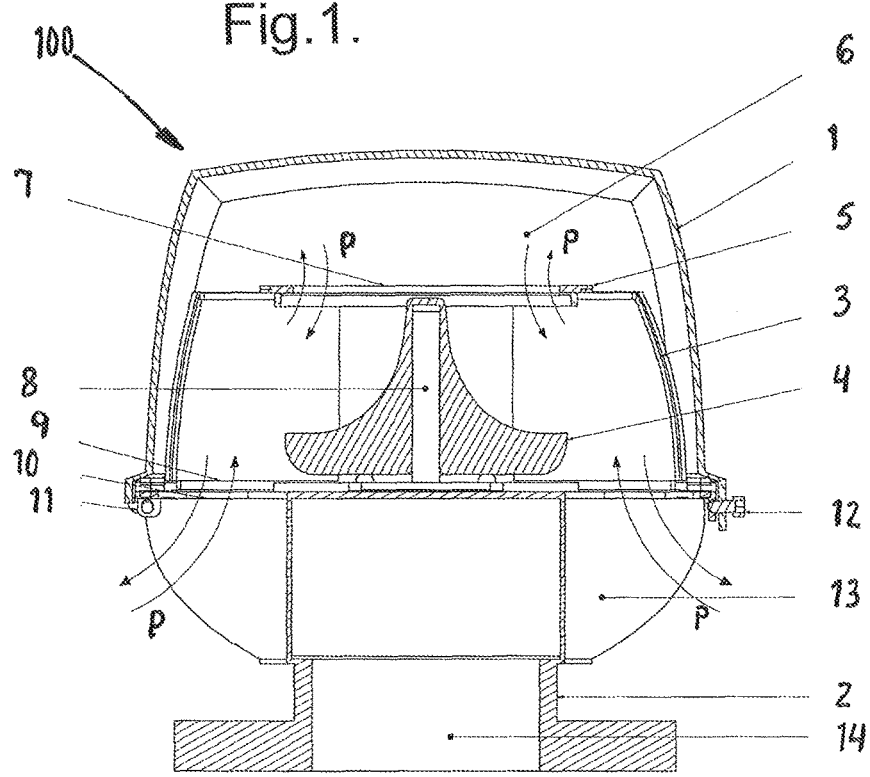
Figure 3A:
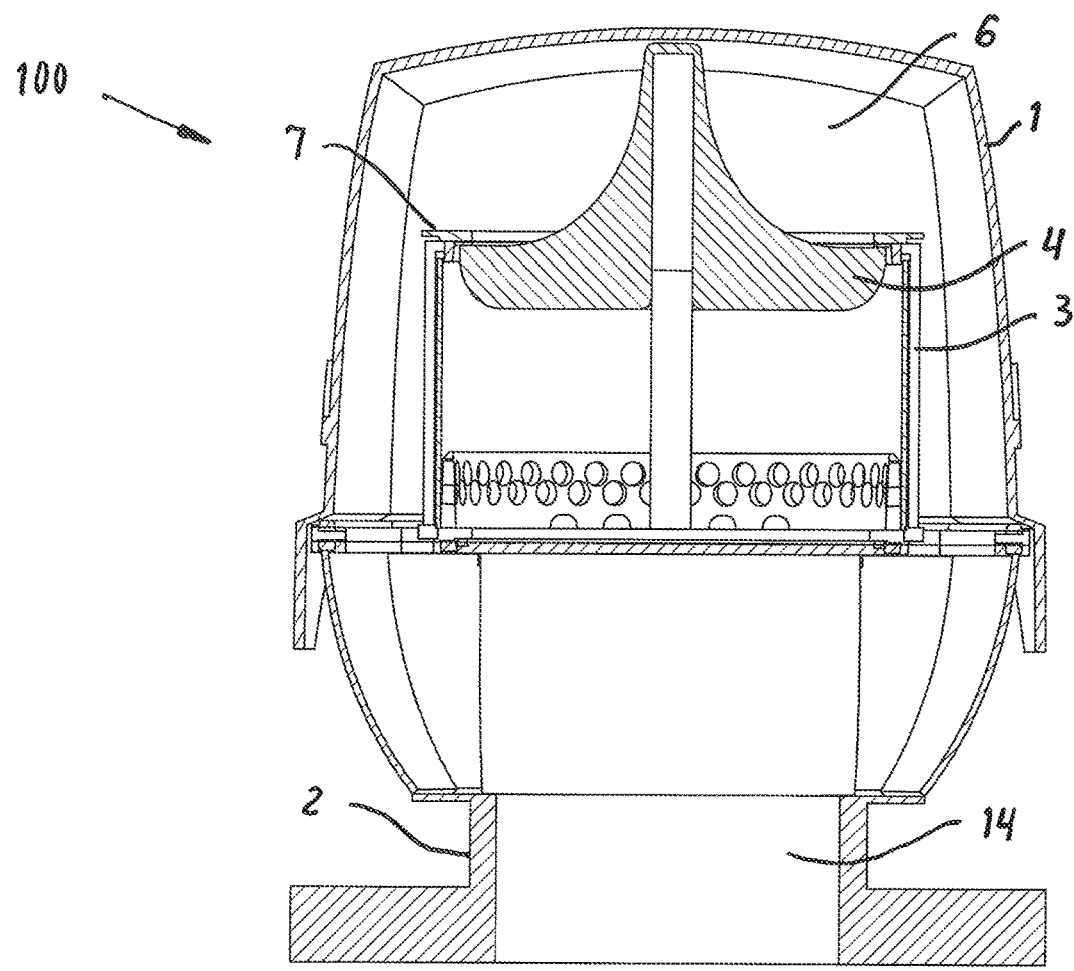
Figure 3B:
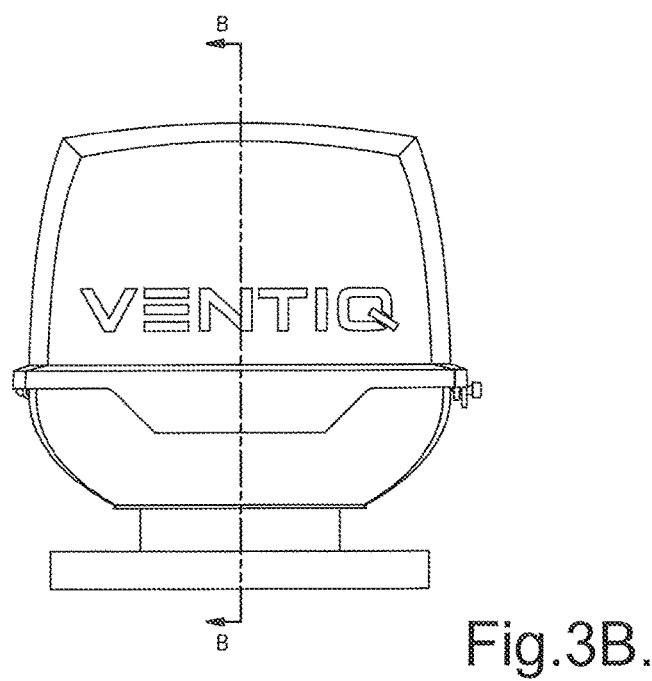
Figure 4A:
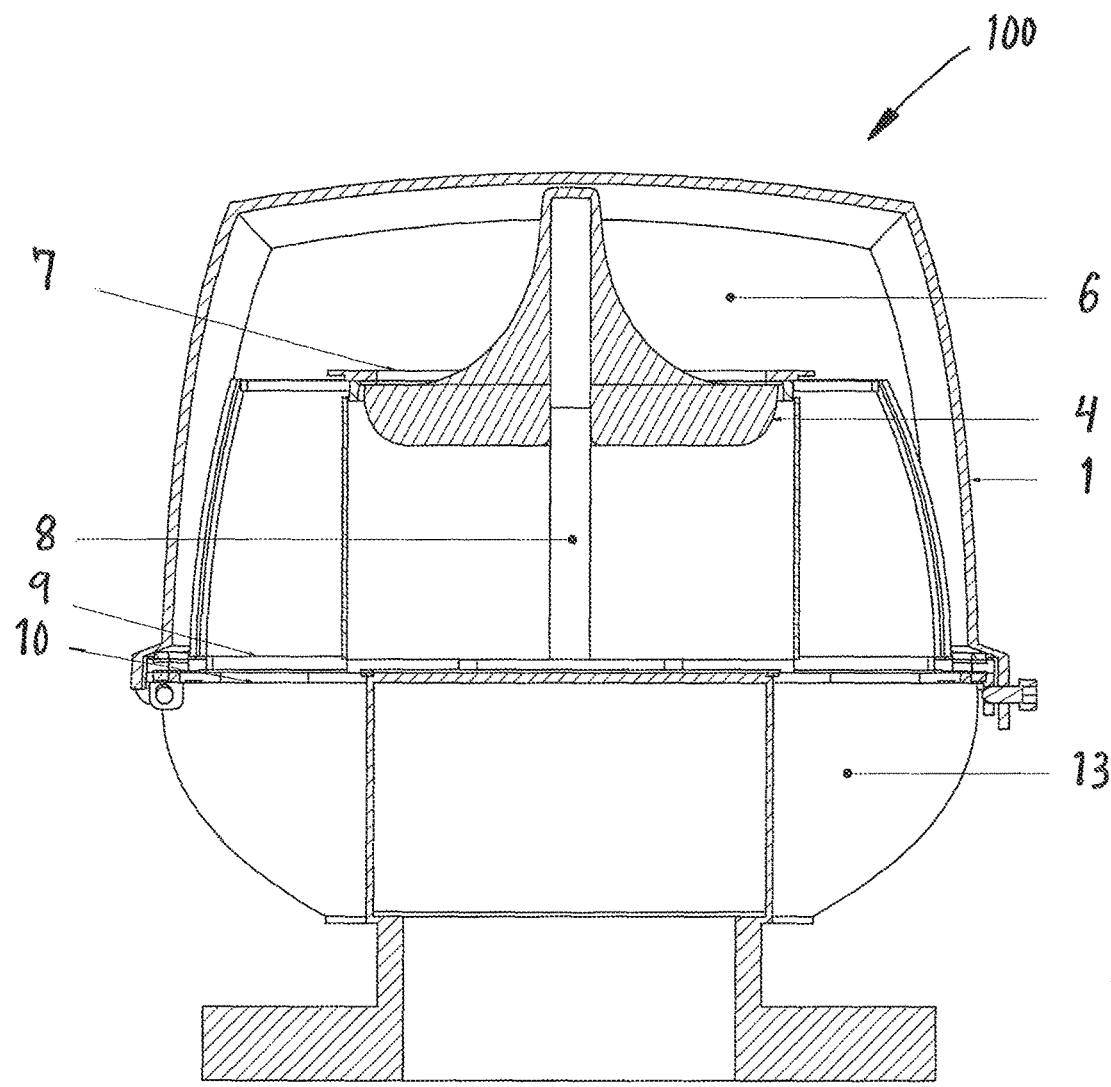
Figure 4B:
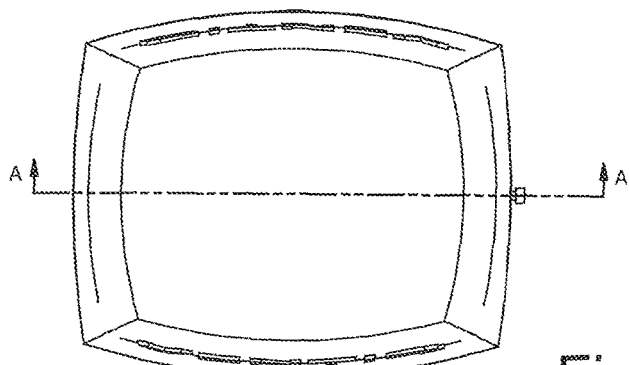

Other and further objects, features and advantages will appear from the following description of preferred embodiments of the invention, which is given for the purpose of description, and given in context with the appended drawings where:

FIG. 1 shows a cross sectional view through the ventilation valve according to the invention, FIG. 2 shows a longitudinal cross sectional view through the ventilation valve according to the invention 90 degrees on the section shown in FIG. 1, FIG. 3A shows a cross sectional view through the ventilation valve along line B-B in FIG. 3B in a second position, FIG. 3B shows where the section B-B extends through the valve, FIG. 4 shows a longitudinal cross sectional view through the ventilation valve along line A-A in FIG. 4B and 90 degrees on the section shown in FIG. 3A, and FIG. 4B shows where the section A-A extends through the valve.

With reference to FIG. 1, the ventilation valve 100 will now be described in closer detail. As mentioned, such ventilation valves are primarily used for ventilation of a tank (not shown) containing a liquid and are used because the liquid surface in the tank fluctuates over time. At the same time the ventilation valve 100 needs to be able to prevent that external liquid, typically sea water, enters into the tank through the ventilation valve 100. The ventilation paths in/out are indicated with various arrows P.

The ventilation valve 100 is assembled by a structural main housing 1, 2 which forms an enclosure around a valve unit made up by a valve housing 3, a moveable buoyant body 4, also called a float, and a sealing element 5 in top as the float 4 can be lifted up against and create a seal. The seal thus impedes ingress of liquid to the tank through the ventilation valve 100.

Further, the ventilation valve includes respective ventilation channels 6, 7, 9, 10, 13, 14, 16 creating open communication between the tank and the atmosphere.

The ventilation valve 100 is deliberately designed such that the valve unit is in the form of a replaceable valve module. As mentioned, this includes the float body 4 and the valve housing 3 in which the float is received.

The structural main housing 1, 2 includes a socket part 2 and one from the socket part 2 releasable cover part 1. The cover part 1 is releasable in order to gain access to the replaceable valve module 3, 4, 5. In particular, it is to be noted that the respective ventilating channels 6, 7, 9, 10, 13, 14, 16 towards the atmosphere are established between the valve module 3, 4, 5 and the cover part 1 when the cover part 1 is arranged on the socket part 2 in its operational state.

It is further to be noted that the ventilation channel 13 towards the atmosphere extends through the bottom of the valve module 3, 4, 5. Thus external water (sea water in heavy sea) that might enter in through the same ventilating channel 13, will lift the float body 4 to sealing contact against the valve housing 3 and impede further inflow to the storage tank itself. This situation is illustrated in FIGS. 3A and 4A. The peripheral top surface of the float body 4 seals against the sealing element 5.

The cover part 1 is shown on the figure releasable arranged via a hinge means 11 which is pivotally arranged on the socket part 2. The cover part 1 is via a locking means 12 lockable provided to the socket part 2. The locking means 12 may preferably be manually operated by simple finger grip, though other alternatives are fully possible.

The valve body 4 is here shown in the form of a float valve that can perform controlled motion in the valve housing 3 via a centrally located axle shaft 8, or guide pin. This could also have been guided externally.

The cover part 1 and the socket part 2 has particular designed surfaces which are intended to lay complementary adjacent to each other when the parts 1, 2 are locked to each other. The surfaces then have a gasket 15 which is sandwiched between them in order to create said ventilation channels without leakages in any direction.

The valve module 3, 4, 5 is conveniently manufactured of a suitable plastic material, such as polyethylene, impact resistant polystyrene or polyurethane.

The cover part 1 and socket part 2 can in turn be manufactured of a suitable metallic material, such as acid resistant steel, Inconel, aluminum or cast iron.

Pure practically, it will be convenient that the ventilating channels 13, 14 against the atmosphere extend substantially 90 degrees vertically to a ship deck.

Typically the valve housing 3 has an annular opening 7 in its top surface and the float valve 4 has a typical onion configuration having a circumferential surface intended for internal sealing against the annular opening 7 in the top surface. It is to be understood by the person skilled in the art that other designs of the float valve and the sealing is fully possible.

The invention claimed is:

1. A ventilation valve for ventilation of a tank containing a liquid where a liquid surface fluctuates over time at the same time as the ventilation valve obstructs external liquid from entering into the tank through the ventilation valve, the ventilation valve comprising:

a structural main housing containing a valve module and respective ventilation channels providing open communication between the tank and the atmosphere, the valve module comprising a movable float body obstructing liquid ingress into the tank through the ventilation valve;

wherein the valve module comprises a valve housing, wherein the movable float body is received in the valve housing;

wherein the structural main housing comprises a socket part and a cover part for attachment to the socket part, said cover part being releasably arranged in order to provide access to the replaceable valve module;

wherein the valve module is clamped between the cover part and the socket part and can be pulled out when the cover part is released from the socket part;

wherein the respective ventilation channels to the atmosphere are established between the replaceable valve module and the releasable cover part when the releasable cover part is arranged on the socket part in its operating state;

wherein the ventilation channel towards the atmosphere extends through a bottom of the valve module; and wherein external water that might enter through the same ventilation channel elevates the movable float body to seal against the valve module and prevents inflow to the tank.

2. The ventilation valve according to claim 1, wherein the releasable cover part is releasably arranged to the socket part.

3. The ventilation valve according to claim 1, wherein the releasable cover part is adapted to be locked to the socket part using a locking device.

4. The ventilation valve according to claim 1, wherein the ventilation channels towards the atmosphere extend substantially 90 degrees vertically relative to a ship deck.

5. The ventilation valve according to claim 1, that wherein the releasable cover part and the socket part comprise surfaces designed to be lying complimentary adjacent to each other when the parts are locked to each other and the surfaces include a gasket being sandwiched between the surfaces.

6. The ventilation valve according to claim 3, wherein the locking device is manually operated.

7. The ventilation valve according to claim 1, wherein a valve body is in the form of a float body and performs controlled motion within the valve housing via an axle shaft.

8. The ventilation valve according to claim 7, wherein the valve housing has an annular opening in its top surface and the float valve has a configuration with a circumferential surface designed for internal sealing against the annular opening in the top surface.

9. The ventilation valve according to claim 1, wherein the valve module is manufactured of a plastic material.

10. The ventilation valve according to claim 9, wherein the plastic material is selected from the group consisting of polyethylene, impact resistant polystyrene, and polyurethane.

11. The ventilation valve according to claim 1, wherein the releasable cover part and the socket part are manufactured of a metallic material.

12. The ventilation valve according to claim 11, wherein the metallic material is selected from the group consisting of acid proof steel, Inconel, aluminum, and cast iron.

* * * * *